United States Patent [19]

Dalla

[11] Patent Number: 6,036,412
[45] Date of Patent: Mar. 14, 2000

[54] COOLANT AND CHIP REMOVAL APPARATUS FOR MILLING OPERATIONS

[76] Inventor: Joseph E. Dalla, 12995 Fircrest Dr., San Martin, Calif. 95046

[21] Appl. No.: 09/046,436

[22] Filed: Mar. 24, 1998

[51] Int. Cl.[7] .................................................. B23C 11/00
[52] U.S. Cl. ............................. 409/136; 408/56; 408/67; 409/137
[58] Field of Search .................. 408/56, 57, 58, 408/59, 60, 67; 451/456; 409/135, 136, 137

[56] References Cited

U.S. PATENT DOCUMENTS

| | | | |
|---|---|---|---|
| 3,880,047 | 4/1975 | Dosier | 408/58 |
| 4,011,792 | 3/1977 | Davis | 409/137 |
| 4,037,982 | 7/1977 | Clement | 408/61 |
| 4,919,232 | 4/1990 | Lofton | 407/11 |
| 5,024,562 | 6/1991 | Arai et al. | 408/1 R |
| 5,033,917 | 7/1991 | McGlasson et al. | 408/67 |
| 5,213,454 | 5/1993 | Givler et al. | 408/61 |
| 5,332,341 | 7/1994 | Arai et al. | 408/61 |
| 5,332,343 | 7/1994 | Watanabe et al. | 409/136 |
| 5,356,245 | 10/1994 | Hosoi et al. | 408/56 |
| 5,395,187 | 3/1995 | Slesinski et al. | 408/1 R |
| 5,474,116 | 12/1995 | Shoda | 144/252 R |
| 5,544,986 | 8/1996 | Kudo et al. | 408/67 |
| 5,584,618 | 12/1996 | Blankenship et al. | 408/56 |
| 5,615,984 | 4/1997 | Oberbreckling | 408/56 |
| 5,779,402 | 7/1998 | Kameda | 408/56 |
| 5,795,216 | 8/1998 | Graves | 451/456 |

FOREIGN PATENT DOCUMENTS

| | | | |
|---|---|---|---|
| 16910 | 1/1988 | Japan | 408/56 |
| 406179108 | 6/1994 | Japan | 408/56 |
| 1454649 | 1/1989 | U.S.S.R. | 409/137 |

*Primary Examiner*—Daniel W. Howell
*Attorney, Agent, or Firm*—David H. Jaffer

[57] ABSTRACT

A housing having a cylindrical upper portion for attachment to the quill of a vertical milling machine. The lower portion of the housing includes two concentric cones of funnel shape extending downward from the upper portion having a funnel opening at the bottom for passage of a cutting tool, and for use as a vacuum port for extraction of waste coolant and chips. The space between the two cones provides passage of air and coolant which is ejected at the bottom of the cones and directed to the cutting tool and work piece. The angle of air ejection depends on the angle of the cone. The housing upper portion has an air input connector for supplying the air to the space between the two concentric cones, and contains channels for directing coolant from a coolant input connection to a plurality of fluid lines configured between the cones to carry the fluid to the opening at the bottom of the cones for directing the coolant towards the cutting tool. The housing upper portion also has a vacuum connector accessing the cavity within the inner cone. Application of a vacuum to the connector pulls coolant and chips from the tool and work piece, through the funnel opening and out the vacuum connector to the input of a vacuum line. The output end of the vacuum line is connected to a container for collecting and separating the chips and coolant. The top portion of the container is separated from a bottom portion by a screen, allowing coolant to pass while trapping chips above.

10 Claims, 5 Drawing Sheets

CROSS SECTION A-A

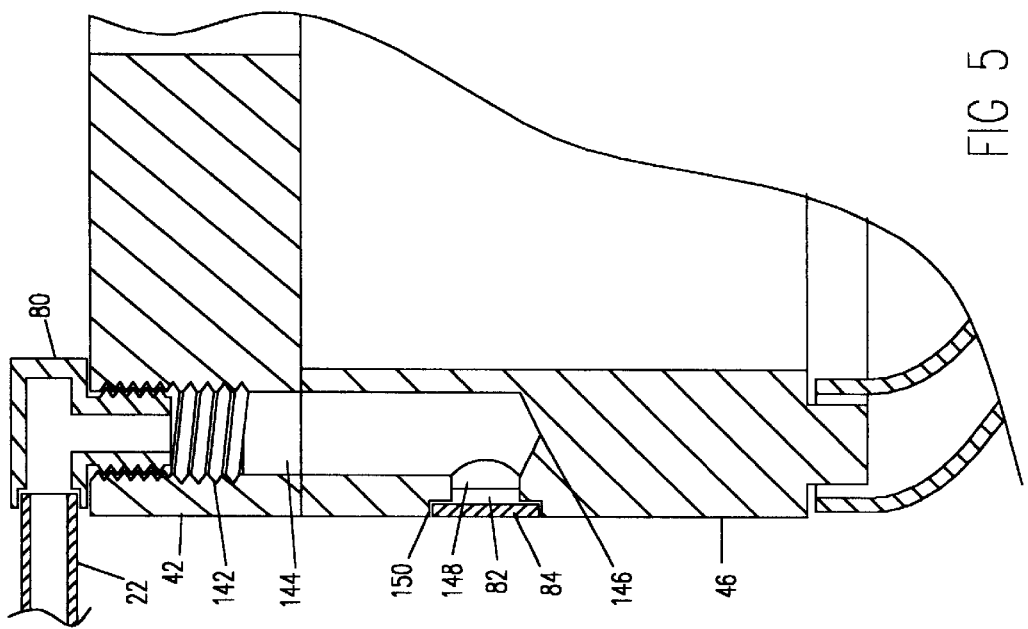
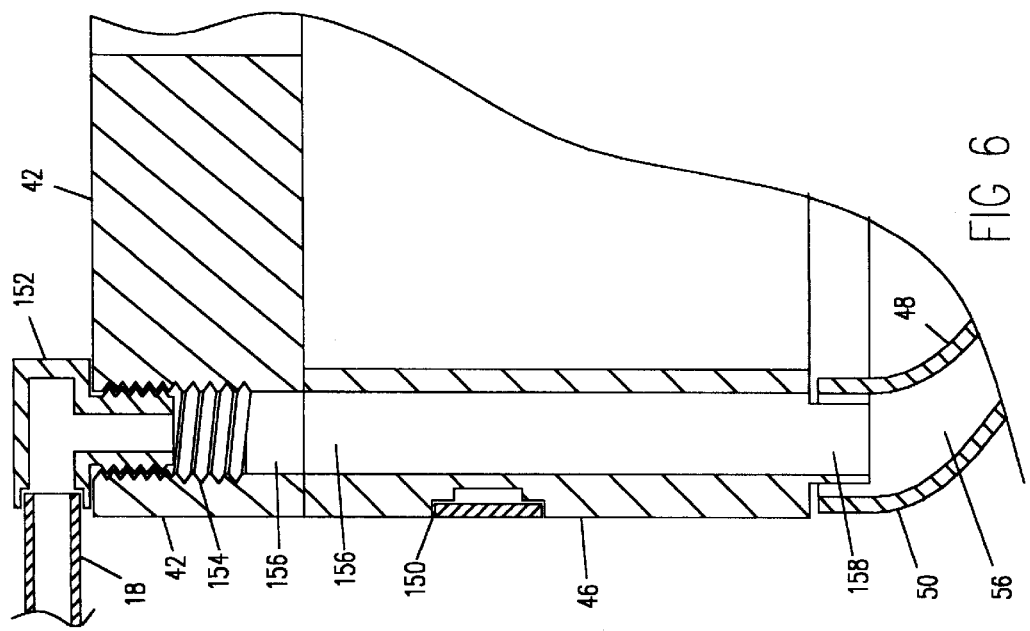

2

COOLANT AND CHIP REMOVAL APPARATUS FOR MILLING OPERATIONS

BACKGROUND OF THE INVENTION

1. Field of the Invention

This invention relates to apparatus for cooling and lubricating cutting tools, and removal of waste products in milling operations, and more particularly to an apparatus for applying coolant and removing and separating waste coolant and chips.

2. Brief Description of the Prior Art

Operation of vertical milling machines at maximum efficiency requires an ample supply of coolant to the cutting tool to extend its usable life, and some means of removing chips which otherwise get caught up by the tool and scar the machine surfaces and damage the tool cutting edge. In the mid to late 1970's coolant atomizers became popular that used air pressure and a venturi to draw coolant through a nozzle tip to spray on the cutter for tool cooling and blowing chips out of the cutter path. These devices are widely used at this time, but have the disadvantage of most often blowing metal chips into the cutter zone, causing cutter failure, and blowing coolant and metal chips into the air. Coolant in the air is a health hazard, and chips littering the mill and machine shop floor are hazardous and time consuming to clean up.

Various attempts have been made to solve the problem of removing chips/cuttings during specific types of machining operations. U.S. Pat. No. 5,474,116 by Schoda describes a chip removing apparatus. It has a skirt 35 that surrounds the machine tool, and an air nozzle 25 surrounding the tool chuck 5. A vacuum is applied to remove the chips. A disadvantage of this device is that it does not apply liquid coolant, and the skirt 35 shields the cutting-tool from view. Other devices have been designed primarily for drilling operations. U.S. Pat. No. 4,037,982 by Clement provides an apparatus having a suction chamber that is spring loaded against the work piece. Air is supplied to the cutting area and a vacuum is applied to remove chips. Like the Schoda device, the cutting surface is not visible to the operator, and in addition, the device cannot be moved freely due to the spring loaded contact; a requirement for milling operations.

It is therefore clear that a need exists for a device that can efficiently apply coolant to a cutting tool of a vertical milling machine, and collect the applied fluid and chips generated in the milling operation.

SUMMARY OF THE INVENTION

It is therefore an object of the present invention to provide an apparatus for use on a vertical milling machine for applying air and coolant to a work piece.

It is a further object of the present invention to provide an apparatus for collecting the coolant applied to a work piece, and chips generated in a milling operation.

It is a still further object of the present invention to provide an apparatus for separating waste coolant and cutting chips collected during a milling operation.

It is a another object of the present invention to provide an apparatus for use on a vertical milling machine that applies coolant and air to the cutting tool, collects the waste coolant and machining chips, while allowing an operator to view the cutting area.

Briefly, a preferred embodiment of the present invention includes a housing having a cylindrical upper portion for attachment to the quill of a vertical milling machine. The lower portion of the housing includes two concentric cones of funnel shape extending downward from the upper portion having a funnel opening at the bottom for passage of a cutting tool, and for use as a vacuum port for extraction of waste coolant and chips. The space between the two cones provides passage of air and coolant which is ejected at the bottom of the cones and directed to the cutting tool and work piece. The angle of air ejection depends on the angle of the cone. The housing upper portion has an air input connector for supplying the air to the space between the two concentric cones, and contains channels for directing coolant from a coolant input connection to a plurality of fluid lines configured between the cones to carry the fluid to the opening at the bottom of the cones for directing the coolant towards the cutting tool. The housing upper portion also has a vacuum connector accessing the cavity within the inner cone. Application of a vacuum to the connector pulls coolant and chips from the tool and work piece, through the funnel opening and out the vacuum connector to the input of a vacuum line. The output end of the vacuum line is connected to a container for collecting and separating the chips and coolant. The top portion of the container is separated from a bottom portion by a screen, allowing coolant to pass while trapping chips above.

An advantage of the present invention is that in provides an apparatus for collecting waste coolant and chips generated in a milling operation, making possible a safer working environment.

A further advantage of the present invention is that it separates the coolant from the chips, allowing the materials to be recycled.

A still further advantage of the present invention is that it provides an apparatus for collecting chips and coolant in a milling operation while allowing an operator to view the cutting tool.

Another advantage of the present invention is that it provides an apparatus for application of coolant and removal of chips and waste coolant in a milling operation, which extends the operational life of the cutting tool and allows more efficient and rapid milling.

IN THE DRAWING

FIG. 5 shows the detail of connection from the coolant supply line to the circumferential channel surrounding the housing tube.

FIG. 6 shows details of the air path between the air input line and the conical cavity of the housing.

DESCRIPTION OF THE PREFERRED EMBODIMENT

Figure 1:
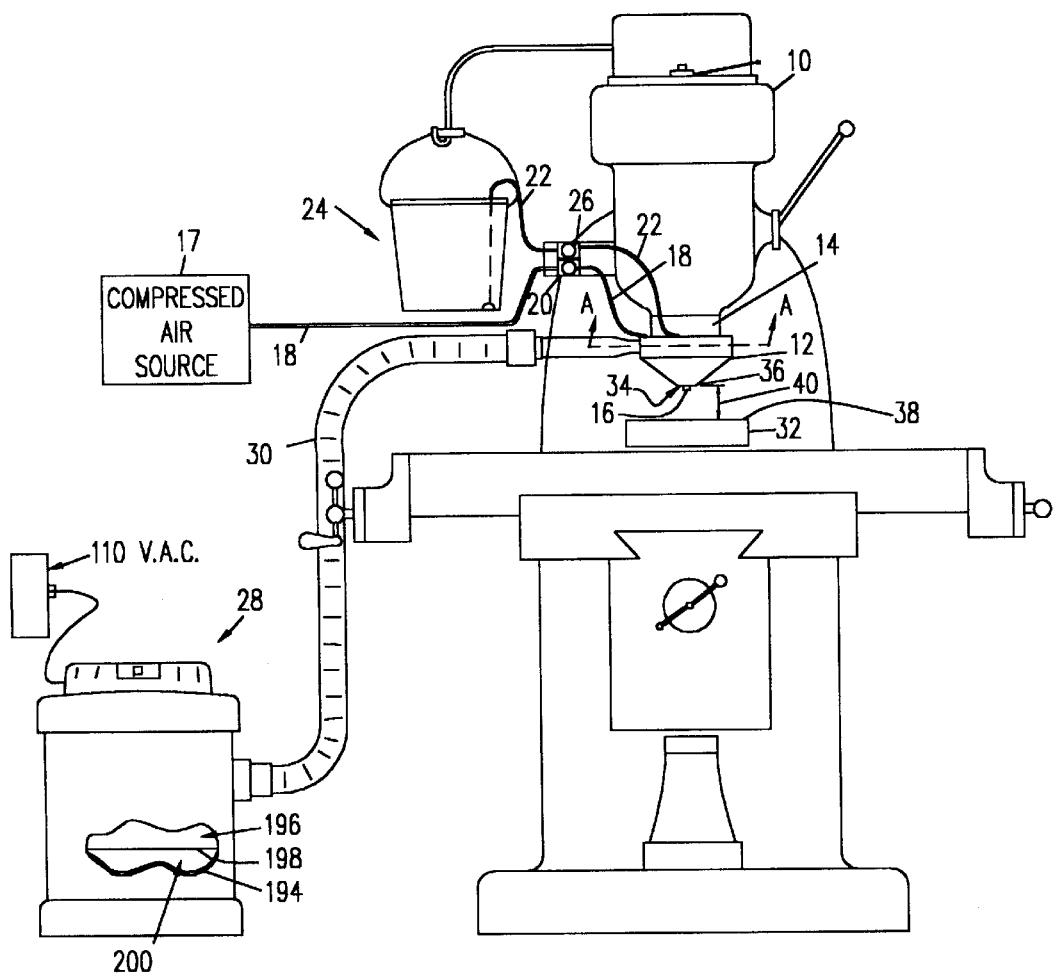
FIG. 1 shows the apparatus of the present invention installed on a milling machine.

Referring now to FIG. 1 of the drawing, a preferred embodiment of the coolant application and chip and waste coolant removal apparatus of the present invention is shown installed on a milling machine 10. The invention includes a housing 12 mounted on a quill 14 of the milling machine 10. Internal to the housing 12, compressed air and coolant are directed to a cutting tool 16. Compressed air from a source 17 is supplied through line 18 and controlled by valve 20. The coolant is supplied through line 22 from a supply reservoir 24, which can be turned off and on by valve 26. A vacuum 28 is connected to the housing 12 through line 30 for the purpose of suctioning waste coolant and cutting chips from a work piece 32 through an opening 34 surrounding the cutting tool 16.

In operation, the bottom edge 36 of the housing 12 and thereby also the opening 34 needs to be placed in close proximity to the surface 38 of the working piece 32. The distance 40 from the housing edge 36 and the work piece is preferably less than ⅛ of an inch in order for the vacuum 28 to provide adequate suction to efficiently collect the chips machined from the work piece 32. The compressed air valve 20 and coolant valve 26 are then opened, and an atomized coolant mixture is sprayed onto the cutting tool and surface of the work piece 32. The vacuum 28 is energized, and collects waste coolant and chips as the tool 12 is applied to the work piece 32.

The details of the novel housing 12 will now be fully described in reference to the figures of the drawing.

Figure 2:
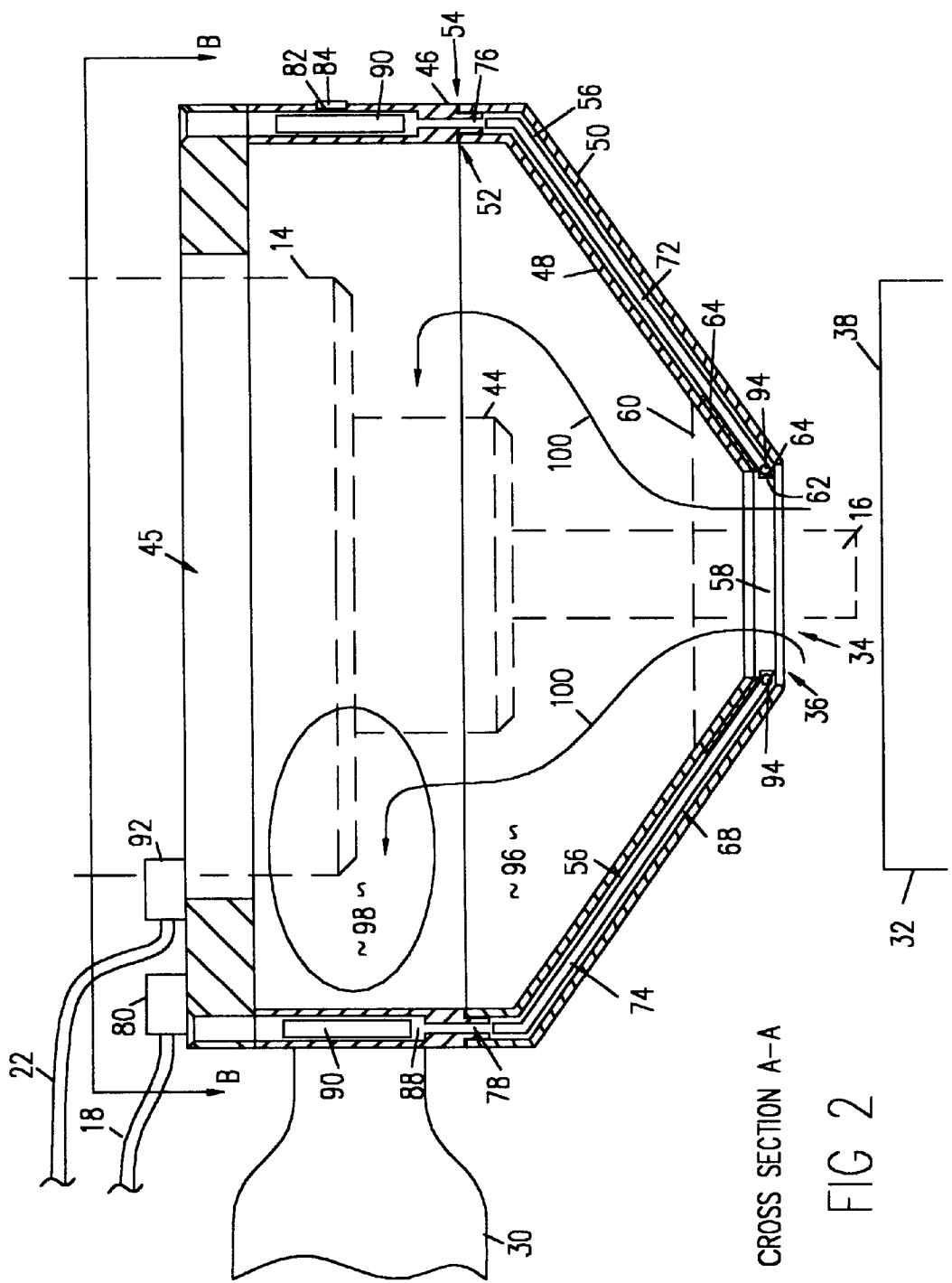
FIG. 2 shows details of the air and coolant supply lines in the housing.
Figure 3:
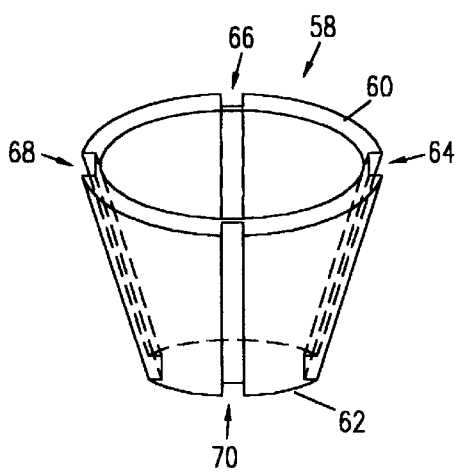
FIG. 3 shows a lower cone having four rectangular channels for passage of coolant tubes, and for direction of pressurized air.

FIG. 2 is a cross section view A—A of the housing 12. A cylindrical top plate 42 has a central bore 45 for passage of the quill 14. The top plate 42 is soldered to the top of a cylindrical tube 46 forming an upper portion of the housing 12. The bottom portion of the housing 12 includes first and second cones 48 and 50, the tops of which are attached to the bottom of the tube 46 at 52 and 54 respectively, around the circumference of each cone. The two concentrically assembled cones define a conical chamber 56, used for passage of compressed air and lines carrying coolant. The space between the cones 48 and 50 at and near the bottom 36 is filled with a cone 58 constructed of solid material, except for four rectangular channels extending from the top 60 of the cone 58 to the cone bottom 62. Referring momentarily to FIG. 3, the details of the cone 58 are more clearly illustrated, showing the four channels 64–70. Channels 64 and 68 are shown cut away in FIG. 2. Each of the four channels 64–70 has a tube extended therethrough for passage of coolant. Two of these, 72 and 74 are shown for example in FIG. 2, extending from the bottom of the housing end 36, through the channels 64 and 68 and through the conical cavity to the intersection between the cones 48 and 50 and the tube 46, where they are pressed into receiving bores 76 and 78 in the tube 46.

The coolant supplied through tube 22 terminates in a connector 80 adapting to a bore in the wall of tube 46, which leads to a circumferential channel 82 on the outside of tube 46. A ring 84 is fitted around the tube 46 to enclose the circumferential channel 82 for passage of coolant. In this way, the coolant goes around the outer circumference of the tube 46 to the radial location of each of the four tubes 72, 74 and the two not shown. Above each tube 72 and 74, the bores 76 and 78 are shown to join bores 86 and 88 wherein fluid directing assemblies 90 pass coolant from the circumferential channel 82 to the bores 76 and 78. The same structure applies to the two tubes and supply structures not shown, positioned at 90 degrees circumferentially from the tubes 72 and 74. The details of the preferred embodiment of assemblies 90 and the channel 82 will be fully described in the following figures of the drawing.

The air supply tube 18 terminates in a connector 92, adapting the tube 18 to a bore through the top plate 42 and the wall of the tube 46 to the conical cavity 56.

Operation of the apparatus of FIG. 1 involves opening the valves 20 and 26 to supply coolant and compressed air. The coolant flows through line 22 and the groove 82 into the four tubes including 72, 74 and the two not shown. The compressed air passes through line 18 to the housing 12, into the conical cavity 56, and then through the space surrounding the tubes 74, etc. surrounding the tubes 72, 74, etc. in the channels 64–70. As the air passes by the ends 94 of the tubes 72, 74, etc., a venturi effect occurs, creating a vacuum at the ends 94 which suctions the coolant out of the tubes 72, 74, etc. The coolant is caught up in the air flow and deposited on a cutting tool 16 and a working piece 32.

FIG. 2 illustrates the apparatus for chip and waste removal. The volume interior to cone 48 and tube 46 will be referred to as a scavage chamber 96. An opening 98 in the tube 46 connects the scavage chamber 96 to the vacuum line 30. Upon activation of the vacuum device 28, air is suctioned from the tool 16 and work piece 32, carrying with it debris including coolant and chips. This debris then passes through the opening 34, into the scavage chamber 96 and out opening 98 and through the line 30 to the vacuum device 28, where it is deposited. The air flow is indicated by arrowed lines 100.

Figure 4:
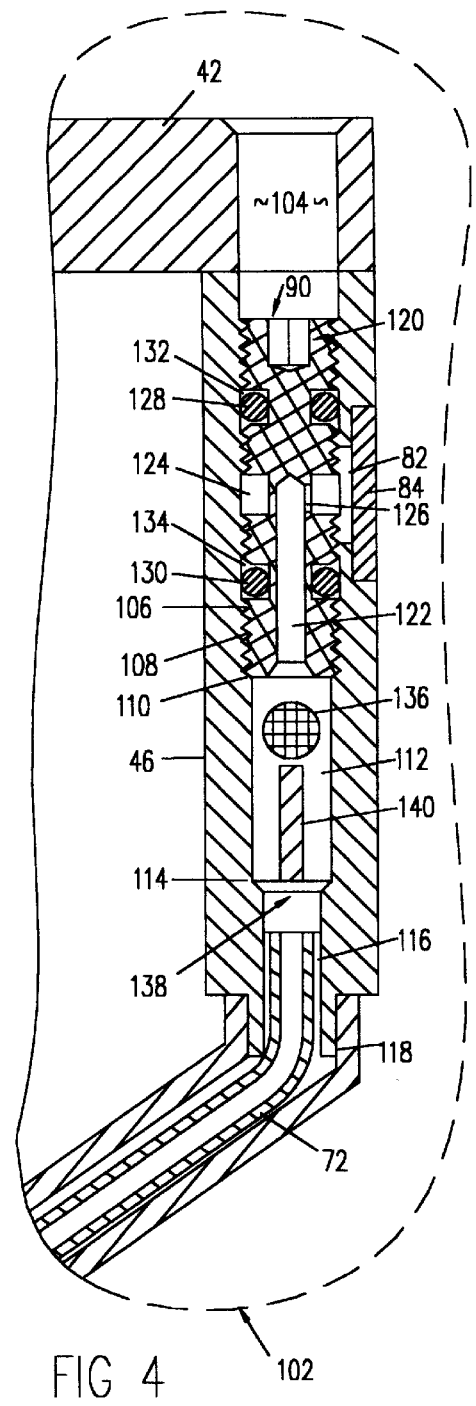
FIG. 4 shows further detail of apparatus for injecting coolant.

Referring now to FIG. 4, an enlarged section 102 of FIG. 2 shows the construction of assembly 90 and associated areas of the housing 12 in detail. A first bore 104 extends through the top plate 42 and into the wall of tube 46 to a depth indicated at 106. A tapped length 108 extends from 106 to 110. A second bore 112 runs from 110 to a depth indicated at 114. A third bore 116, smaller in diameter than bore 112, extends from depth 114 to the end of the tube 46 at 118.

The assembly 90 includes a threaded member 120 secured in tapped length 108. A bore 122 extending partially through member 120 opens into bore 112. An annular groove 124 around member 120 is fluidly connected to bore 122 by a transfer bore 126. The diameter of bore 104 is designed to intersect and make fluid connection to the circumferential channel 82. The ring 84, forming one wall of the channel 82 is shown clearly in FIG. 4. Fluid flowing through the channel 82 continues through annular groove 124 and bore 126 to bore 122, and through bore 112 into tube 72. The fluid from channel 82 is restricted to pass through bore 126 as a result of the two O-rings 128 and 130 in annular grooves 132 and 134, positioned above and below bore 126 respectively, and compressed between the grooves and bore 104.

The preferred embodiment provides fluid flow by elevating the reservoir above the ends of tubes 72, 74, etc. allowing the force of gravity to initiate flow, which is enhanced in operation by the venturi effect explained above. The use of a pressurized coolant supply is also included in the spirit of the present invention as an alternate embodiment. Coolant is restricted from flowing back towards the reservoir through use of a check-ball 136 positioned in bore 112 below the opening 138 to bore 122. The ball 136 is held in close proximity to opening 138 through use of a thin vein 140 pressed into the bore 112 preventing the ball 136 from moving downward from opening 136 more than a predetermined amount.

The apparatus supplying coolant to the other tubes, including tube 74 and the two tubes not shown is identical to that shown in FIG. 4. The details of the interconnection from the coolant line 22 connector 80 to the channel 82 are illustrated in FIG. 5 which shows a cross sectional view of a portion of tube 46, top plate 42, line 22 and connector 80. The connector 80 mates with a tapped length 142 in the top plate 42 which makes fluid connection to a bore 144 through any remaining portion of the top plate 42, and then to a depth 146 in the wall of tube 46. A bore 148 then makes fluid connection between the channel 82 and bore 144. The annular position of the interconnection of FIG. 5 around the housing 12 can be at any convenient place. Of course, it can not be positioned for example where it would interfere with the apparatus 90 for connecting between the channel 82 and the tubes 72, 74, etc. The ring 84 installation is most clearly shown in FIG. 5 and is preferably soldered in a second groove 150 serving to position the ring 84 over the channel 82.

The detail of the interconnection from the pressurized air supply to the conical cavity is shown clearly in FIG. 6. The line 18 passes air through connector 152, making connection with a threaded length 154 of the top plate 42. The air continues from the threaded length 154 into a bore 156 through any remainder of the top plate 42 and through the length of the wall of the tube 46, exiting through a reduced diameter bore 158, into the conical cavity 56 between cones 48 and 50.

Figure 7:
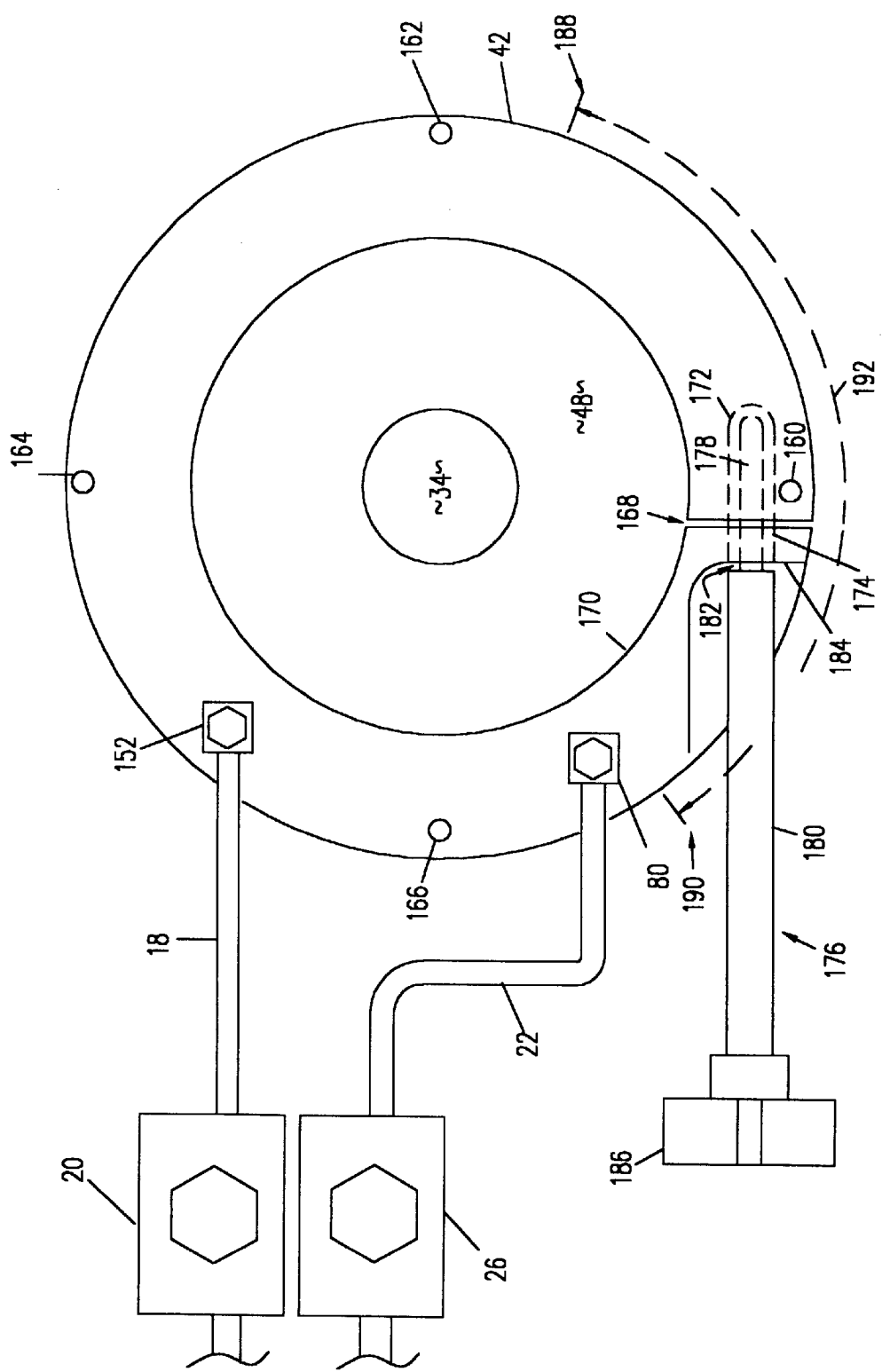
FIG. 7 is a top view of the housing illustrating apparatus for attaching the housing to a milling machine quill.

Further detail of the housing is shown in the top view B-B of FIG. 7. The four assemblies 90 and associated structures exemplified in FIG. 4 are preferably positioned at 90° intervals, such as at 160–166. The air supply line 18, valve 20 and connector 152, and coolant supply line 22, valve 26 and connector 80 are shown attached to the top plate 42. A slot 168 is cut entirely through the plate 42 to allow a small amount of flexibility in the inner diameter 170 of the cylindrical shaped plate 42. The plate 42 has a tapped hole 172 on one side of the slot 168 and a clearance hole 174 on the opposite side of the slot 168. A bolt structure 176 has a threaded portion 178 for engagement in the tap 172 and an enlargened diameter shank 180 providing a shoulder for bearing against face 184. As an operator turns the structure 176 with knob 186 to further engage the threaded portion 178 with the tapped hole 172, the gap 168 collapses. This feature is used to clamp the top plate 42 to a quill 14 of a milling machine. In order to allow the top plate 42 to close the gap 168, the plate is not soldered to the tube 46 over a limited portion of the circumference of the tube 46, for example, from position 188 to position 190 as indicated by the arrow line 192.

Referring again to FIG. 1 of the drawing, a preferred embodiment of the vacuum device includes apparatus for separating coolant from chips. The preferred structure is illustrated in FIG. 2, wherein an illustrative cut-away portion of the vacuum device reveals a screen 194 within the waste collection cavity. The chips accumulate in the space 196 above the screen 198, and the coolant flows through the screen and is deposited in the space 200 below.

The above description is given as the preferred embodiment of the present invention. Various modifications of the apparatus will be apparent to those skilled in the art for accomplishing the same purpose. These modifications are to be included in the spirit of the present invention. For example, although four tubes 72, 74, etc. and associated supply structure are described to direct coolant, any number of tubes, etc. can be used. Similarly, although the shape of the housing resembles a funnel having a conically shaped structure forming a conical cavity for air supply, other shapes accomplishing the same purpose are included in the invention. The method of mounting the housing to the quill of a milling machine as shown is the preferred method, but various other methods are also included, such as apparatus mounted to the top plate for engaging one or more bolts radially onto the quill, etc.

What is claimed is:

1. A debris removal apparatus for use with a milling machine for applying atomized coolant to a cutting tool, and for removing waste coolant and cutting chips in a milling operation, said apparatus comprising:

(a) a housing upper portion including
        (i) attachment apparatus for securing said debris removal apparatus to a quill of said milling machine
        (ii) air receiving apparatus for receiving compressed air;
        (iii) coolant receiving apparatus for receiving coolant; and
        (iv) an exhaust port for connecting to a vacuum for removal of said waste coolant and chips; and
    (b) a housing lower portion including a scavage chamber with a tapered wall structure having a tapered external surface with a larger dimensioned upper portion extending downward from said housing upper portion to a smaller dimensioned bottom rim surrounding a bottom opening for passage of a cutting tool for allowing a mill operator a view of a cutting area;
    (c) air passage apparatus for transferring air from said air receiving apparatus to exit at said bottom rim toward said cutting tool; and
    (d) coolant passage apparatus for transferring air from said coolant receiving apparatus to exit at said bottom rim toward said cutting tool.

2. The apparatus of claim 1 wherein said air passage apparatus and coolant passage apparatus are constructed within said wall structure.

3. The apparatus of claim 2, wherein said wall structure further includes:
    (a) an outer wall; and
    (b) an inner wall concentric with said outer wall.

4. The apparatus of claim 3, wherein said air passage is a passage between said inner wall and said outer wall.

5. The apparatus of claim 4, wherein said coolant passage is concentric with said air passage.

6. The apparatus of claim 5, wherein said air passage is a channel of square cross section formed in a conically shaped member positioned between said outer wall and said inner wall.

7. The apparatus of claim 6, wherein said coolant passage is a tube positioned within said air passage.

8. An apparatus for collecting cutting debris during use of a milling machine comprising:

(a) a funnel shaped housing for attachment to a quill of a milling machine including
        (i) an exhaust port for connection to a vacuum for removal of said debris;
        (ii) a scavage chamber having a tapered wall structure having a tapered external surface tapering from a larger dimension to a bottom rim of smaller dimension surrounding a bottom opening for passage of a milling machine tool, said smaller dimension for allowing a mill operator a view of a cutting tool and a working surface of a material to be milled, and said tapered wall structure having a plurality of concentric air and coolant supply passages for directing said air and coolant downward toward a working surface of a material to be milled and toward a cutting tool;
        (iii) air receiving apparatus for receiving and passage of compressed air to said air supply passages; and
        (iv) coolant receiving apparatus for receiving and passage of coolant to said coolant supply passages.

9. The apparatus of claim 8 further comprising a collection apparatus for connection to said exhaust port and for application of a vacuum for collection of said debris.

10. The apparatus of claim 9, wherein said debris collection apparatus further includes a collection container having a screen for separating an upper portion and a lower portion, said upper portion for collection of solid material and said lower portion for collection of liquid.

\* \* \* \* \*